United States Patent [19]

Takagi et al.

[11] Patent Number: 5,394,698
[45] Date of Patent: Mar. 7, 1995

[54] HYDRAULIC TRANSMISSION APPARATUS

[75] Inventors: Izumi Takagi; Hisayoshi Shibata, both of Akashi, Japan

[73] Assignee: Kawasaki Junkogyo Kabushiki Kaisha, Kobe, Japan

[21] Appl. No.: 36,388

[22] Filed: Mar. 24, 1993

[30] Foreign Application Priority Data

Mar. 26, 1992 [JP] Japan .................................. 4-068230

[51] Int. Cl.6 ............................................ F16D 31/02
[52] U.S. Cl. ................................. 60/438; 192/103 FA
[58] Field of Search .................. 60/435, 437, 438, 439, 60/440, 487, 488, 489; 475/76; 192/103 FA

[56] References Cited

U.S. PATENT DOCUMENTS

| | | | |
|---|---|---|---|
| 1,080,281 | 12/1913 | Kellogg | 60/437 |
| 3,184,913 | 5/1965 | Anderson et al. | 475/76 |
| 3,508,401 | 4/1970 | Alpin | 60/489 |
| 4,815,288 | 3/1989 | Yamaguchi et al. | 60/487 |
| 4,941,371 | 7/1990 | Koyama et al. | 475/76 |

FOREIGN PATENT DOCUMENTS 61-23412 6/1986 Japan .
2190668 7/1990 Japan .

Primary Examiner—F. Daniel Lopez
Attorney, Agent, or Firm—Leydig, Voit & Mayer

[57] ABSTRACT

A hydraulic transmission apparatus has: a swash plate hydraulic pump having a pump cylinder block; and a swash plate hydraulic motor which has a motor cylinder block and is arranged coaxially in a line with the swash plate pump so as to face in the same direction as the hydraulic pump. The hydraulic pump and motor area connected by a hydraulic passage system. The pump swash plate is provided at a side of the motor cylinder block, the side being close to the hydraulic pump. The motor swash plate is provided at a side of the motor cylinder block, the side being remote from the hydraulic pump, and its tilt angle is varied so as to vary the capacity of the hydraulic motor. The hydraulic passage system has a valve body provided at a side of the hydraulic pump so as to be substantially coaxial with the hydraulic pump. A hydraulic distributor ring is provided so as to be in slidable contact with the valve body. The apparatus of the invention enhances transmission efficiency, reduces the inertia moment of the apparatus by achieving a reduced diameter thereof, and enhances the vehicle mountability.

15 Claims, 13 Drawing Sheets

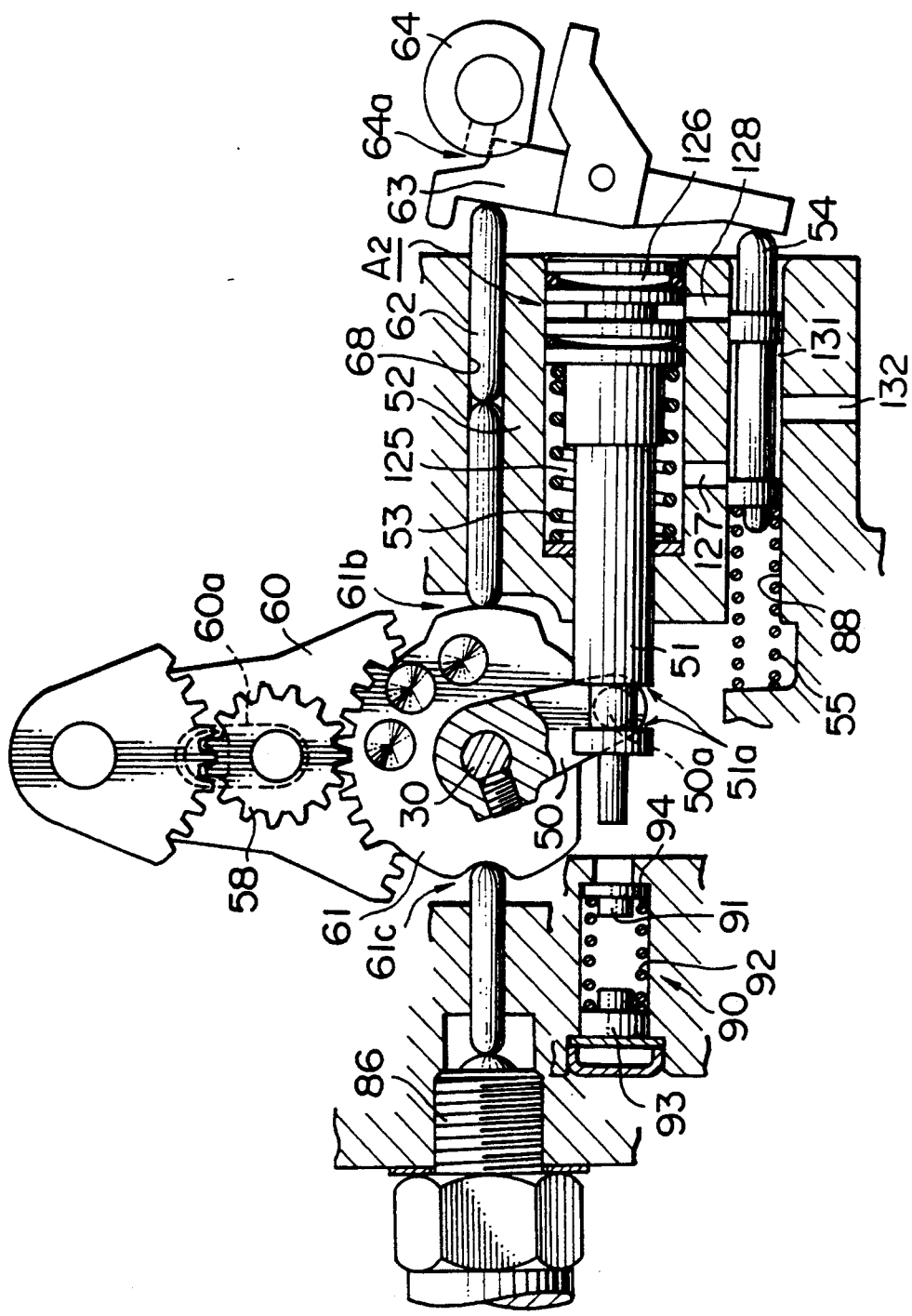

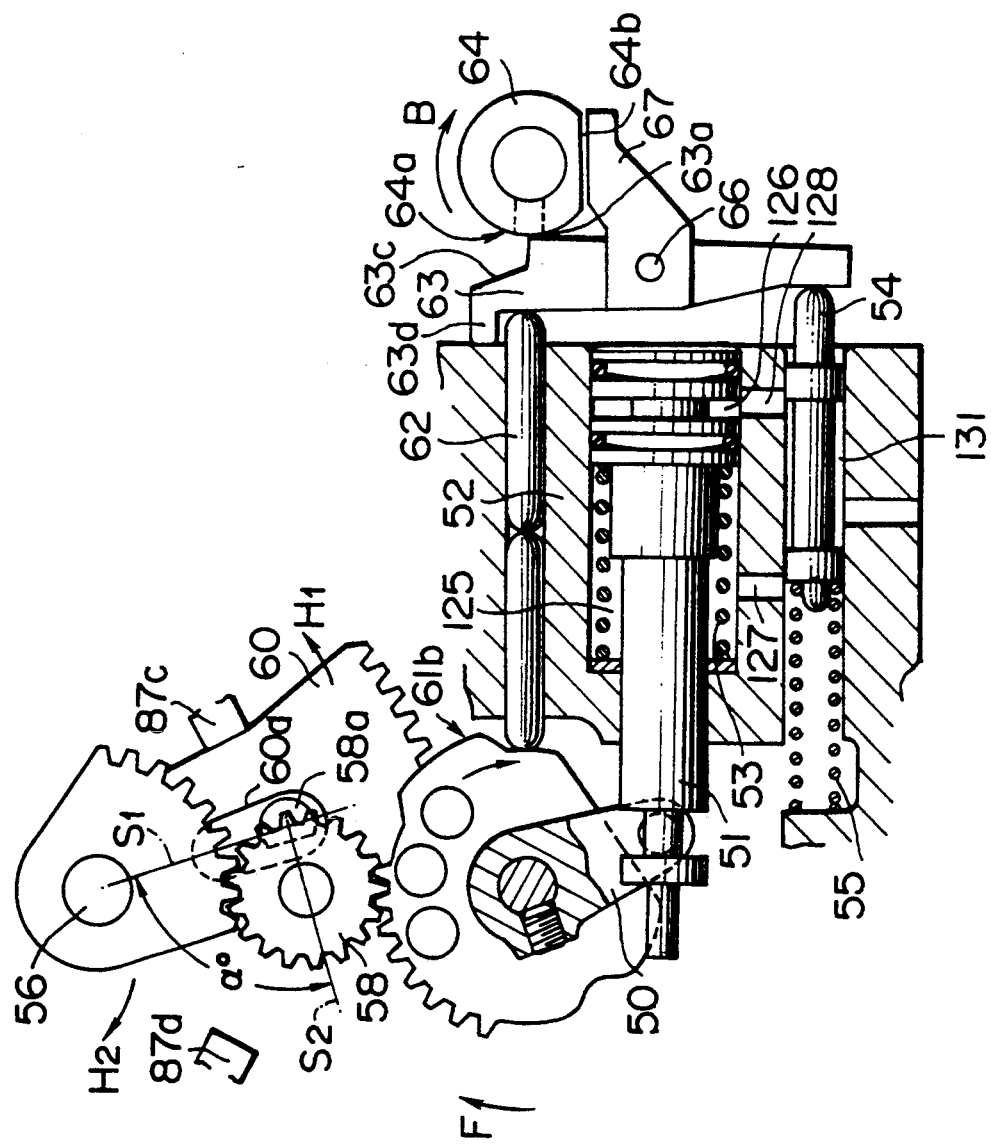

HYDRAULIC TRANSMISSION APPARATUS

BACKGROUND OF THE INVENTION

1. Field of the Invention

The present invention relates to a hydraulic transmission apparatus which is able to vary the capacity of a swash plate hydraulic motor connected to a swash plate hydraulic pump by means of a hydraulic passage, by varying the angle of the swash plate of the hydraulic motor.

2. Description of the Related Art

Japanese Utility Model Publication No. 42-19728, Japanese Patent Publication Nos. 61-23412 and 32-7159, Japanese Patent Unexamined Publication No. 2-190668, etc. disclose so-called divided-transmission type hydraulic transmission apparatuses which employ mechanical transmission means for partial power transmission. Each of the apparatuses disclosed in the above-mentioned Japanese Utility Model-Publication No. 42-19728 and Japanese Patent Publication No. 61-23412 comprises a hydraulic pump and a hydraulic motor which is provided around the hydraulic pump. Each of the apparatuses disclosed in the above-mentioned Japanese Patent Publication No. 32-7159 and Japanese Patent Unexamined Publication No. 2-190668 comprises a hydraulic pump and a hydraulic motor which are arranged in a line so as to face in opposite directions.

The conventional devices described in Japanese Utility Model Publication No. 42-19728 and Japanese Patent Publication No. 61-23412 requires a hydraulic motor having an increased diameter, resulting in an increased moment or inertia. Therefore, the hydraulic transmission apparatus according to these disclosures is not suitable for operation in a relatively high rotational speed range. Even if a wide range of tranmission ratios is not needed, a significant reduction of the size of the hydraulic motor is difficult because the hydraulic motor surrounds the hydraulic pump.

The conventional device according to Japanese Patent Publication No. 32-7159 and Japanese Patent Unexamined Publication No. 2-190668 can reduce the size of the hydraulic motor. However, according to these disclosures, a distributor valve positioned between the hydraulic motor and the hydraulic pump is apart from a stationary member, for example, the transmission case. Therefore, the apparatus disclosed in Japanese Patent Unexamined Publication No. 2-190668 has distributor valve adjusting means provided in a stationary member surrounding the motor cylinder block, thus requiring as many distributor valves as motor plungers. The construction of the apparatus is thus complicated. Further, because the distributor valves are spool-shape valves, they are not capable of automatically controlling the gaps in the sliding surfaces, thus requiring high-precision working to substantially eliminate the gaps to prevent fluid from leaking therefrom. In the apparatus disclosed in Japanese Patent Publication 32-7159, because the stationary shaft supporting the distributor valve provided in a middle portion of the apparatus is extended from an end portion of the apparatus, the stationary supporting shaft inevitably becomes long, thus making it difficult to achieve the high torsional rigidity required for consistent timing of the distributor valve. The distributor valve of this apparatus also lacks the above-mentioned capability of automatic gap reduction and, therefore, requires high-precision working to substantially eliminate the gaps on the sliding surface.

Japanese Utility Model Publication No. 42-19728 also describes direct transmission clutch means which is provided in an end portion of the hydraulic transmission apparatus so as to directly connect the input shaft and the motor cylinder, thus enhancing the transmission efficiency. However, this device increases the axial length of the hydraulic transmission apparatus as well as the diameter thereof, thus impeding installation of the apparatus into a vehicle, i.e., it has poor vehicle mountability.

SUMMARY OF THE INVENTION

An object of the present invention is to provide a hydraulic transmission apparatus which enhances the transmission efficiency, reducing the size and weight thereof by reducing the diameter of the hydraulic motor, and thereby enhances the vehicle mountability.

Another object of the present invention is to provide a hydraulic transmission apparatus which enhances the durability and the transmission efficiency in a high rotational speed range.

Accordingly, the present invention provides a hydraulic transmission apparatus comprising: a hydraulic pump having a pump cylinder block; a hydraulic motor which has a motor cylinder block and is arranged coaxially in a line with the swash plate pump so as to face in the same direction as the hydraulic pump; a hydraulic passage system connecting the hydraulic pump and the hydraulic motor; a pump swash plate provided at a side of the motor cylinder block, the side being close to the hydraulic pump; a motor swash plate which is provided at a side of the motor cylinder block, the side being remote from the hydraulic pump, and whose tilt angle is varied so as to vary the capacity of the hydraulic motor; an intermediate drum surrounding the pump cylinder block; a valve body provided at a side of the hydraulic pump so as to be substantially coaxial with the hydraulic pump, the valve body being a component part of the hydraulic passage system; and a hydraulic distributor ring provided so as to be in slidable contact with the valve body.

A hydraulic transmission apparatus according to the present invention may further comprise a direct transmission hydraulic clutch provided between the pump cylinder block and the intermediate drum.

Further, a governor valve may be provided on a passage for carrying fluid to the direct transmission hydraulic clutch so as to increase the fluid pressure in accordance with an increase of the rotational speed.

If the pump cylinder block is rotated by rotation of the input shaft, the swash plate hydraulic pump is operated. The fluid ejected from the hydraulic pump is sent to the hydraulic motor by means of the distributor ring (distributor valve) which has a capability for automatic gap reduction. The motor cylinder block is rotated by a resultant torque of a reaction torque which pump plungers in the ejection process provide for the motor cylinder block by means of the pump swash plate and a reaction torque which motor plungers in the expansion process receive from the motor swash plate.

When the hydraulic motor is stopped, the governor valve is closed because there is no centrifugal force. In other words, fluid is not supplied to the chamber of the direct transmission hydraulic clutch.

As the rotational speed of the hydraulic motor is increased, the governors valve opens due to a centrifugal force and, thus allows fluid to flow to the direct transmission hydraulic clutch. Because the pressure of the fluid coming from the governor valve is substantially in proportion to the square of the rotational speed of the hydraulic motor, the direct transmission hydraulic clutch becomes half connected in an intermediate speed range, allowing for a kick-down operation, and it becomes completely connected, achieving direct transmission, in a high speed range.

Further objects, features and advantages of the present invention will become apparent from the following description of the preferred embodiments with reference to the attached drawings.

BRIEF DESCRIPTION OF THE DRAWINGS

FIG. 6 is an enlarged sectional view of clutch control means in the neutral position.

FIG. 12 is an enlarged sectional view of the clutch control means in the forward operation position.

DESCRIPTION OF THE PREFERRED EMBODIMENT

The preferred embodiments of the present invention will be described hereinafter with reference to the attached drawings.

Figure 1:
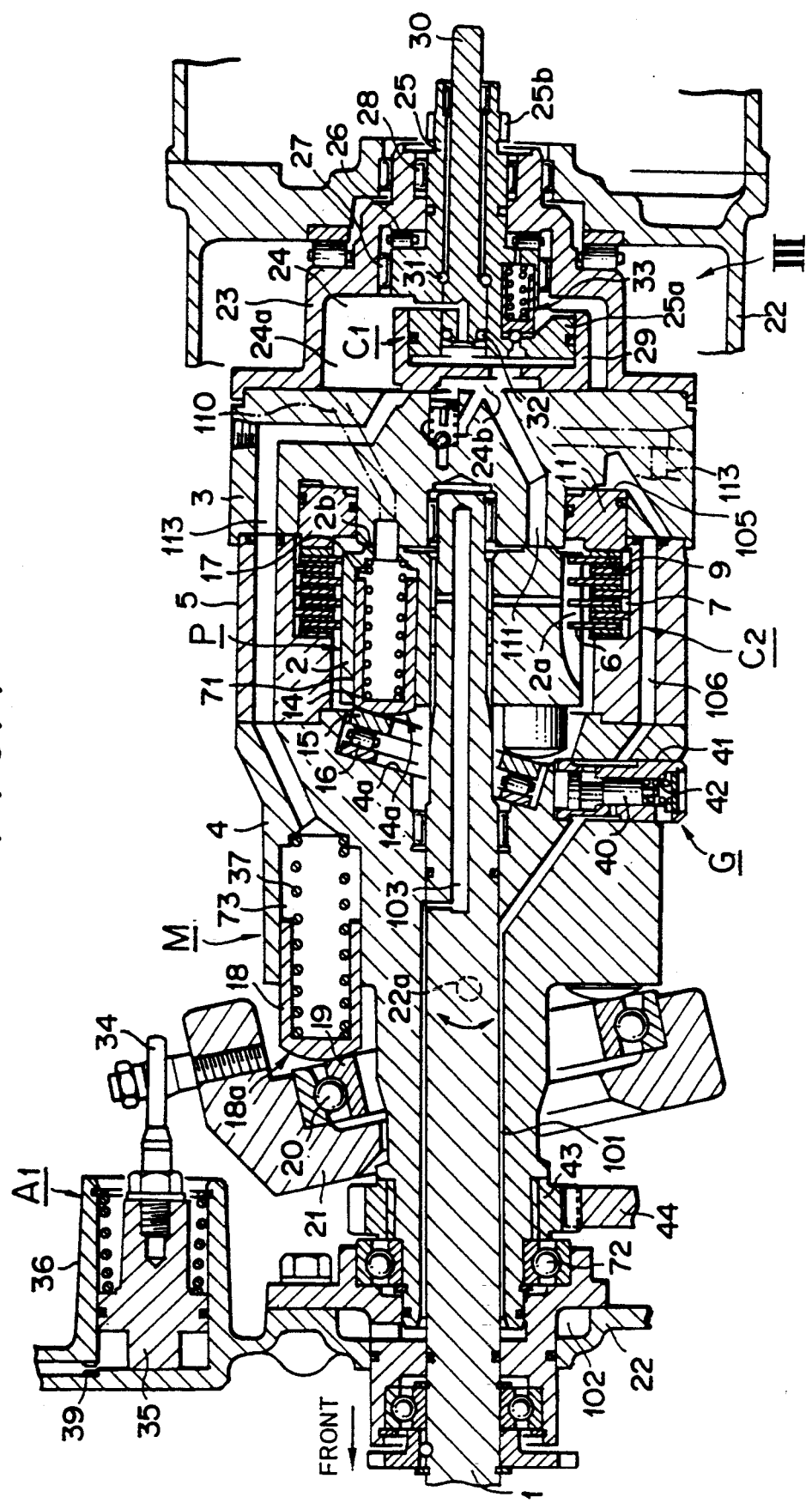
FIG. 1 is an entire longitudinal sectional view of a hydraulic transmission apparatus according to the present invention.

FIG. 1 shows an overall longitudinal sectional view of a hydraulic transmission apparatus according to the present invention, omitting the shift means. The front of the apparatus is defined as indicated by the arrow, in order to facilitate the following description.

First, the overall construction of the transmission apparatus will be described with reference to FIG. 1. A transmission input shaft 1 is drivingly connected to the engine (not shown). Surrounding the transmission input shaft 1, a swash plate hydraulic motor (an axial type plunger motor) M and a swash plate hydraulic pump (an axial type plunger pump) P are arranged in a line along the axis of the apparatus, the swash plate hydraulic motor M being closer to the front.

More specifically, starting from the front, a motor swash plate 19, a motor cylinder block 4, a pump swash plate 15 and a pump cylinder block 2 are arranged in order in a line along the axis. The pump cylinder block 2 is surrounded by an intermediate drum 5 which extends around the outer peripheral surface of the pump cylinder block 2 and is separated therefrom by a gap. A direct transmission hydraulic clutch C2 is provided in the gap between the intermediate drum 5 and the pump cylinder block 2. A valve body 3 having a hydraulic passage is provided in the rear of the intermediate drum 5 and the pump cylinder block 2. The valve body 3 is rigidly connected at its rear end to a rear cover 23. The rear cover 23 contains: a hydraulic distributor ring 29 which divides the cavity 24 inside the rear cover 23 into an outer cavity 24a and an inner cavity 24b, and selects the forward and backward operations; a fluid distributor ring supporting shaft 25 for supporting the hydraulic distributor ring 29; a spool 30 for switching a main clutch C1; etc. A hydraulic actuator A1 is provided in the upper front of the motor swash plate 19. The hydraulic actuator A1 performs automatic speed-change control by changing the angle of the motor swash plate 19.

The hydraulic pump P will be described. The inside surface of the pump cylinder block 2 is fitted on the outer peripheral surface of a rear end portion of the input shaft 1, by means of splines, so that the pump cylinder block 2 is rotated together with the input shaft 1. The pump cylinder block 2 has an odd number, e.g., five, of cylindrical holes 71 which are circumferentially and equidistantly arranged. Each cylindrical hole 71 extends parallel to the input shaft 1, and the opening thereof faces the front. A cylindrical pump plunger 14 is fitted in each cylindrical hole 71 so as to axially slide and protrude forward therefrom. Each pump plunger 14 has a blunt spherical portion 14a formed at its front end. The blunt spherical portion 14a of each pump plunger 14 abuts on the pump swash plate 15 provided in front thereof. The pump swash plate 15 guides the reciprocating movements of the pump plungers 14. The pump swash plate 15 is positioned on a rear slant surface 4a of the motor cylinder block 4 by means of a thrust bearing 16. On the other hand, each pump plunger 14 contains a coil spring 17 provided between the pump plunger 14 and the inside rear surface of the corresponding cylindrical hole 71. Thus, the pump plungers 14 are forced forward to the pump swash plate 15 so that the pump swash plate 15 will not fall off. At the same time, because the coil springs 17 force the pump cylinder block 2 backward to the valve body 3, an enhanced sealing characteristic of a sliding seal surface 2b abutting on the pump cylinder block 2 during a low-speed operation is achieved. Further, because the coil springs 17 force the respective pump plungers 14 forward, the hydraulic pump P obtains a self-suction capability.

The hydraulic motor M will next be described. The motor cylinder block 4 is rigidly connected to the valve body 3 by means of the intermediate drum 5. The inside peripheral surface of the motor cylinder block 4 is rotatably fitted over the input shaft 1, intervened by a ring-like fluid passage 101. The motor cylinder block 4 is supported by a transmission case 22 by means of a bearing 72, etc. The motor cylinder block 4 has an odd number, e.g., nine, of cylindrical holes 73 which are circumferentially and equidistantly arranged. Similar to the cylindrical holes 71 of the pump cylinder block 2, each cylindrical hole 73 extends parallel to the input shaft 1, and the opening thereof faces the front. As show in FIG. 1, cylindrical holes 73 do not overlap cylindrical holes 71 in the axial direction in this embodiment. A cylindrical motor plunger 18 is fitted in each cylindrical hole 73 so as to axially slide and protrude forward therefrom. Each motor plunger 18 has a blunt spherical portion 18a formed at its front end. The blunt spherical portion 18a of each motor plunger 18 abuts on the motor swash plate 19 provided in front thereof. The motor swash plate 19 guides the reciprocating movements of the motor plungers 18. The motor swash plate 19 is supported by a swash plate holder 21 by means of a rolling element 20. On the other hand, each motor plunger 18 contains a coil spring 37 provided between the motor plunger 18 and the inside rear surface of the corresponding cylindrical hole 73. Thus, the motor plungers 18 are forced forward and, further, the pump motor M is provided with a self-suction capability.

The swash plate holder 21 is supported by the transmission case 22 by means of a trunnion shaft 22a lying perpendicularly to the input shaft 1, so that the swash plate holder 21 is pivotable about the axis of the trunnion shaft 22a. The above-mentioned hydraulic actuator A1 can vary the angle of the swash plate holder 21 with respect to a plane perpendicular to the axis of the input shaft 1, and thereby adjust the strokes of the motor plungers 18, thus continuously changing the motor capacity.

The fluid passage will next be described. The ring-like fluid passage 101 formed over the circumference of the input shaft 1 is connected at a front end portion of the ring-like fluid passage 101 to an HST charging feed pump (not shown) or the like by way of a ring-like fluid chamber 102. The hydraulic fluid is supplied from an oil catcher or the like through the ring-like fluid chamber 102 to the ring-like fluid passage 101.

Figure 2:
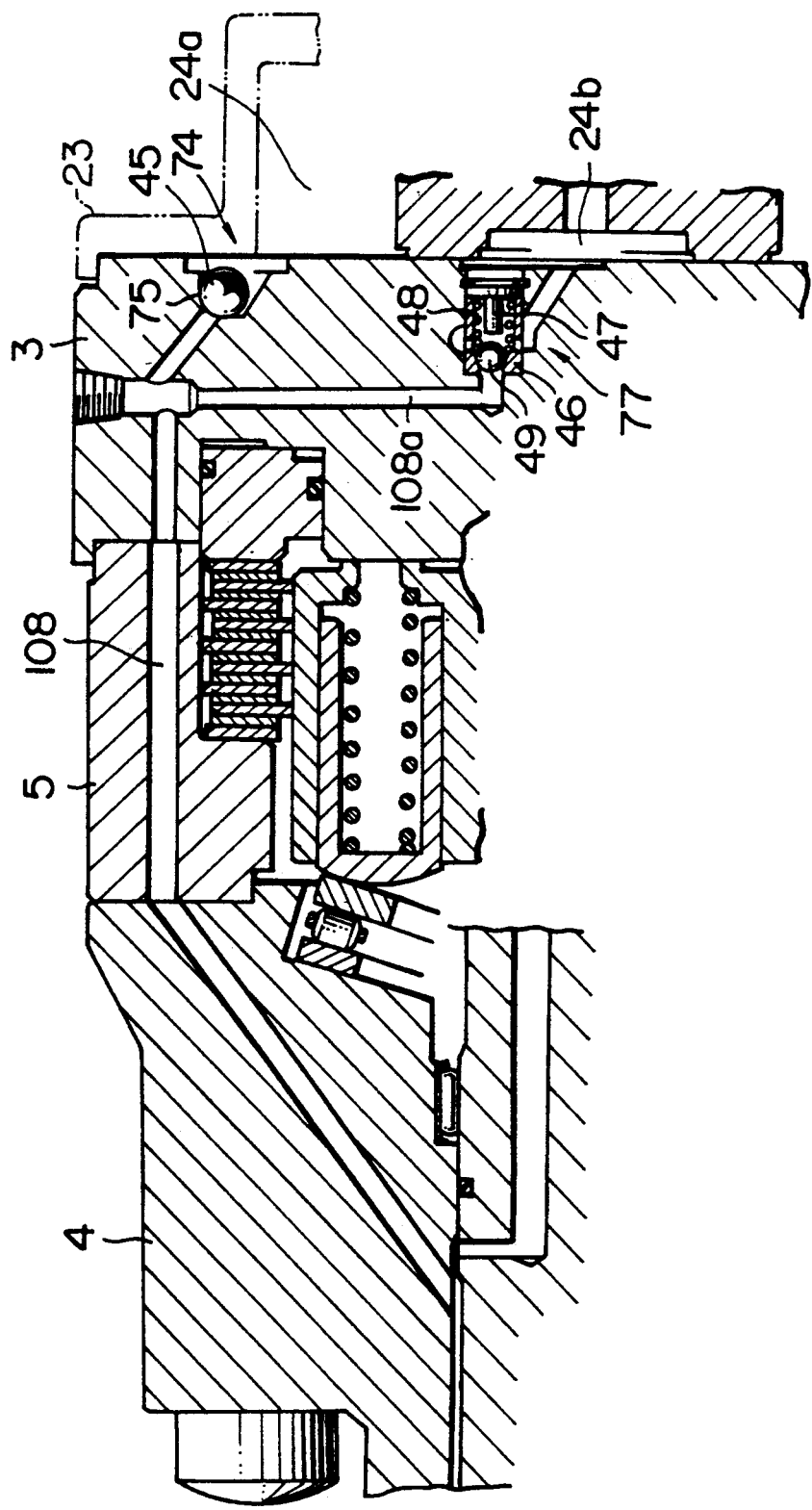
FIG. 2 is an enlarged partial longitudinal sectional view of a portion including a charging fluid passage of the hydraulic transmission apparatus shown in FIG. 1.

The ring-like fluid passage 101 connects at its rear end portion to: a direct transmission hydraulic clutch cooling fluid passage 103 extending through at least a portion of the input shaft 1 to the direct transmission hydraulic clutch C2; a direct transmission hydraulic clutch operating fluid passage 106 extending through the motor cylinder block 4, the intermediate drum 5 and the valve body 3 to an operating fluid chamber 105 of the direct transmission hydraulic clutch C2; and a charging fluid passage 108 extending through the motor cylinder block 4, the intermediate drum 5 and the valve body 3 to the outer cavity 24a inside the rear cover 23, as shown in FIG. 2.

As shown in FIG. 2, the opening of the charging fluid passage 108 to the outer cavity 24a is provided with a check valve 74. The check valve 72 is composed of a valve seat 75 formed on the valve body 3 and a steel ball 45 which fits onto the valve seat 75. The check valve 72 is opened if the steel ball 45 is moved backward, that is, toward the outer cavity 24a. The valve seat 75 has a surface angled in such a manner that during rotation of the valve body 3, a centrifugal force acting on the steel ball 45 causes the steel ball 45 to move backward, thus opening the check valve 74.

The charging fluid passage 108 has a branch passage 108a reaching to the inner cavity 24b. The opening of the branch passage 108a to the inner cavity 24b is provided with a check valve 77. The check valve 77 is composed of: a valve seat 46; a compressed coil spring 48; a steel ball 49 pressed onto the valve seat 46 by the restoring force of the compressed coil spring 48; and a stopper rod 47. The check valve 77 is located in substantially the central portion of the valve body 3.

The operating fluid supplied from the charging fluid passage 108 to the cavity 24 is conducted through the hydraulic pump P to the hydraulic motor M, and then returned to the cavity 24 by way of a certain passage. This passage will be described. As shown in FIG. 1, the valve body 3 has pump-in passages 110 and pump-out passages 111 (shown in upper and lower parts, respectively, of the valve body 3 in FIG. 1) which connect the cavity 24 and the hydraulic pump P. A pump-in passage 110 connects the outer cavity 24a and a pump cylindrical hole 71 which is currently operated for suction (as shown in an upper part of FIG. 1), and thus carries the operating fluid from the outer cavity 24a to the pump cylindrical holes 71. A pump-out passage 111 connects the inner cavity 24b and a pump cylindrical hole 71 which is currently operated for ejection (as shown in a lower part of FIG. 1), and thus carries the operating fluid from the pump cylindrical holes 71 to the inner cavity 24b.

The motor cylindrical holes 73 of the hydraulic motor M are respectively connected to motor in-out passages 113 which extend through the motor cylinder block 4, the intermediate drum 5 and the valve body 3 to the cavity 24. The rear openings of the motor in-out passages 113 are arranged along the circumference of a circle having its center on the rotational axis. As the valve body 3 rotates together with the motor cylinder block 4, the motor in-out passage 113 of a motor cylindrical hole 73 which is currently operated for expansion connects to the inner cavity 24b (as shown in a lower part of FIG. 1) and thus carries the fluid from the inner cavity 24b to the motor cylindrical hole 73. Simultaneously, the motor in-out passage 113 of a motor cylindrical hole 73 which is currently operated for discharge connects to the outer cavity 24a (as shown in an upper part of FIG. 1) and thus carries the fluid from the motor cylindrical hole 73 to the outer cavity 24a.

The construction of the rear cover 23 will be described with reference to FIGS. 1 and 3. As mentioned above, the rear cover 23 is rigidly coupled to the rear end surface of the valve body 3 so that they are rotated together. The above-mentioned cavity 24 is surrounded by the rear end surface of the valve body 3 and the inside surface of the rear cover 23. The hydraulic-distributor ring supporting shaft 25 provided in the cavity 24 has substantially the same axis as the input shaft 1. The hydraulic distributor ring supporting shaft 25 is rotatably supported by the rear cover 23 by means of radial bearings 27 and 28, and stopped from shifting backward, without being prevented from rotating, by means of a thrust bearing 26 which is provided between the hydraulic distributor ring supporting shaft 25 and a rear stepped portion of the rear cover 23.

The supporting shaft 25 has an eccentric cylindrical portion 25a which is formed together with a front end portion of the supporting shaft 25 but has an axis apart from the axis of the supporting shaft 25. The eccentric cylindrical portion 25a is fitted in the above-mentioned hydraulic distributor ring 29 having a substantial bottom. Thereby, the cavity 24 inside the rear cover 23 is divided into the outer cavity 24a which is outside the hydraulic distributor ring 29 and the inner cavity 24b which is inside the fluid distributor ring 29. The front end surface of the hydraulic distributor ring 29 is pressed by the pressure of the operating fluid in the inner cavity 24b so as to slidably contact the rear end surface of the valve body 3. Therefore, because the force pressing the hydraulic distributor ring 29 onto the rear end surface of the valve body 3 varies with the pressure of the fluid in the inner cavity 24b, a gap between the hydraulic distributor ring 29 and the valve body 3 is automatically eliminated in accordance with the fluid pressure therein. Further, the hydraulic distributor ring 29 can be selectively positioned at the forward driving position F, the neutral position N and the rear driving position R, as shown in FIG. 5, by rotation of the supporting shaft 25.

Figure 3:
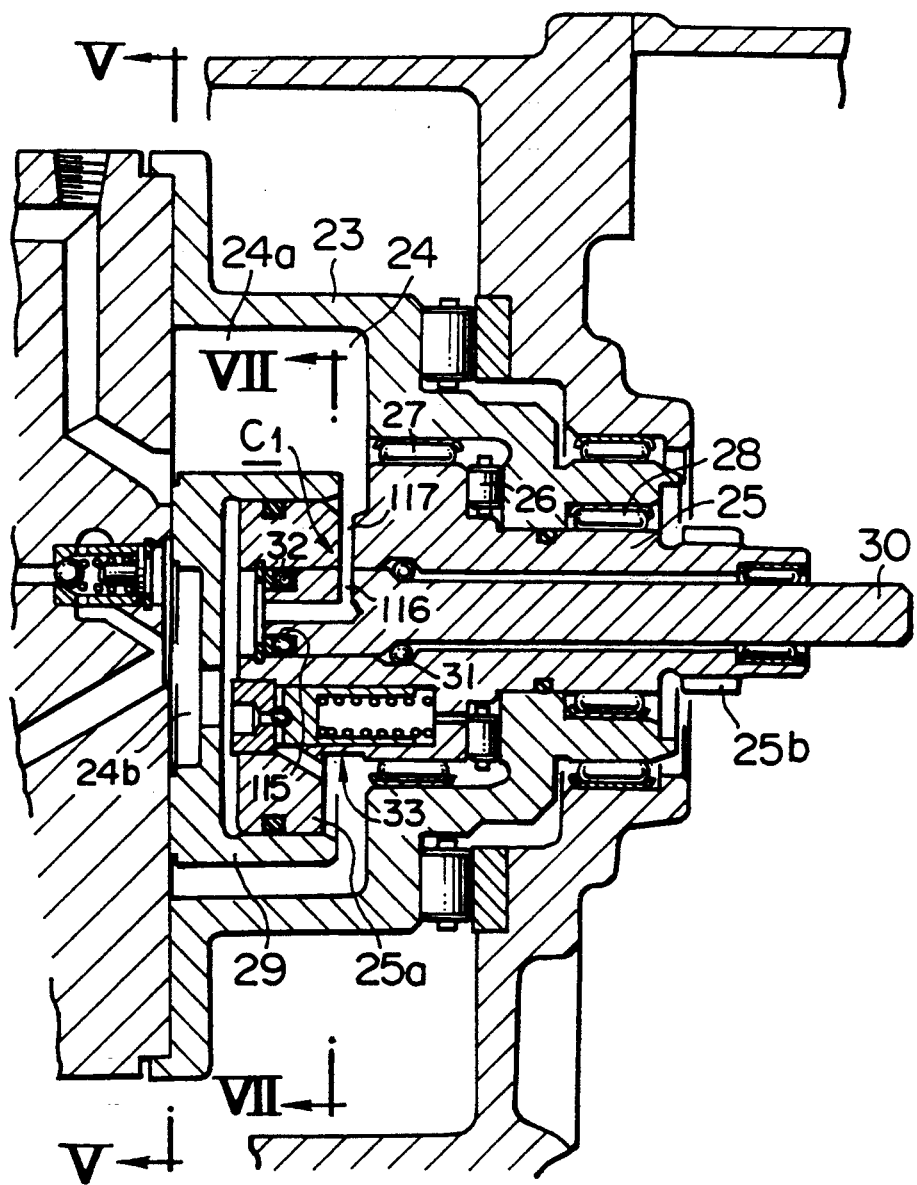
FIG. 3 is an enlarged view of a portion III shown in FIG. 1.
Figure 5:
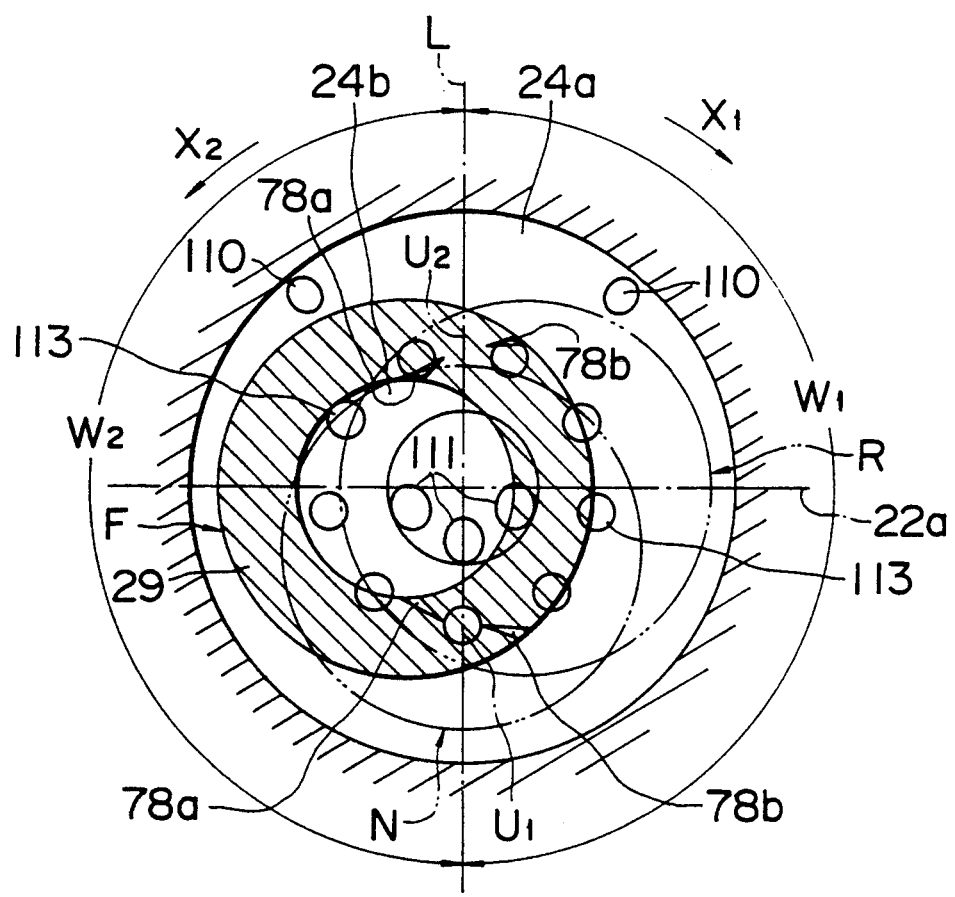
FIG. 5 is a sectional view taken on the line V—V of FIG. 3.

Referring to FIG. 5 showing an enlarged sectional view taken on the line V—V of FIG. 3, the top dead center (the most compressed point) U1 and the bottom dead center (the most expanded point) U2 of the motor plungers 18 are present on a line L perpendicular to the above-mentioned trunnion shaft 22a (referred to as "a driving direction border line L"). Provided that the forward driving rotation is indicated by the arrow X1, the neutral position N of the distributor ring 29 is defined to be a position where the center of the distributor ring 29 is on the driving direction border line L and closest to the top dead center U1. The forward driving position F is defined to be a position which is rotated about the axis of the supporting shaft 25 by substantially 90°˙ from the neutral position N in the direction indicated by the arrow X1. The rear driving position R is defined to be a position which is rotated about the axis of the supporting shaft 25 by substantially 90° from the neutral position N in the direction indicated by the arrow X2.

Two pump-in passages 110 are provided so as to be connected to the outer cavity 24a. More specifically, the rear openings of these passages are positioned in upper portions close to the rear cover 23 so that the pump-in passages 110 are connected to the outer cavity 24a no matter which of the positions: the forward driving position F, the neutral position N or the rear driving position R, the distributor ring 29 assumes.

Three pump-out passages 111 are provided so as to be connected to the inner cavity 24b. More specifically, the rear openings of these passages are arranged in a lower portion close to the rotational axis so that the pump-out passages 111 are connected to the inner cavity 24b no matter which of the positions: the forward driving position F, the neutral position N or the rear-driving position R, the distributor ring 29 assumes.

The rear openings of the nine motor in-out passages 113 are equidistantly arranged along the circumference of a circle having a center substantially coinciding with the rotational axis and a radius substantially half the radius of the cavity 24. A region W1 is defined to extend from the bottom dead center U2 to the top dead center U1 in the forward driving rotational direction X1 (substantially the right half region in the figure). A region W2 is defined to extend from the top dead center U1 to the bottom dead center U2 in the forward driving rotational Direction X2. When the distributor ring 29 is at the forward driving position F, the motor in-out passages 113 which are currently in the region W1 are connected to the outer cavity 24a, and the motor in-out passages 113 which are currently in the region W2 are connected to the inner cavity 24b. More specifically, during the forward driving rotation, the motor cylindrical holes 73 connected to the motor in-out passages 113 which are currently in the region W1 are in the discharge process, and the motor cylindrical holes 73 connected to the motor in-out passages 113 which are currently in the region W2 are in the expansion process. Thus, the hydraulic motor M is rotated in the forward driving rotational direction X1.

If the distributor ring 29 is at the neutral position N, the motor in-out passages 113 which are currently in a region substantially above the trunnion shaft 22a, which region includes the bottom dead center U1, are connected to the outer cavity 24a, and the motor in-out passages 113 which are currently in a region including the top dead center U1 are connected to the inner cavity 24b. Thus, the hydraulic motor M is not rotated.

If the distributor ring 29 is at the rear driving position R, the motor in-out passages 113 which are currently in the region W1 are connected to the inner cavity 24b, and the motor in-out passages 113 which are currently in the region W2 are connected to the outer cavity 24a. More specifically, during the rear driving rotation, the motor cylindrical holes 73 connected to the motor in-out passages 113 which are currently in the region W1 are in the expansion process, and the motor cylindrical holes 73 connected to the motor in-out passages 113 which are currently in the region W2 are in the discharge process. Thus, the hydraulic motor M is rotated in the rear driving rotational direction X2.

The front end surface (the sliding surface) of the distributor ring 29 has a pair of wedge-shape grooves 78a and another pair of wedge-shape grooves 78b formed close to its inside and outside peripheries, respectively. The two pairs of wedge-shape grooves 78a and 78b are positioned so that when the distributor ring 29 is at the forward and rear driving positions F and R, one of the grooves 78a and one of the grooves 78b come close to the top dead center U1, the grooves being in the different regions W1, W2, and so that the other grooves 78a and 78b come close to the bottom dead center U2, the grooves being in the different regions W1, W2. When a motor in-out passage 113 passes either the top dead center U1 or the bottom dead center U2, the opening thereof is gradually closed by means of the adjacent groove as it moves from one of the cavities 24a or 24b to underneath the distributor ring 29, and then it is gradually opened by means of the adjacent groove as it moves from underneath the distributor ring 29 to the other cavity.

Figure 8:
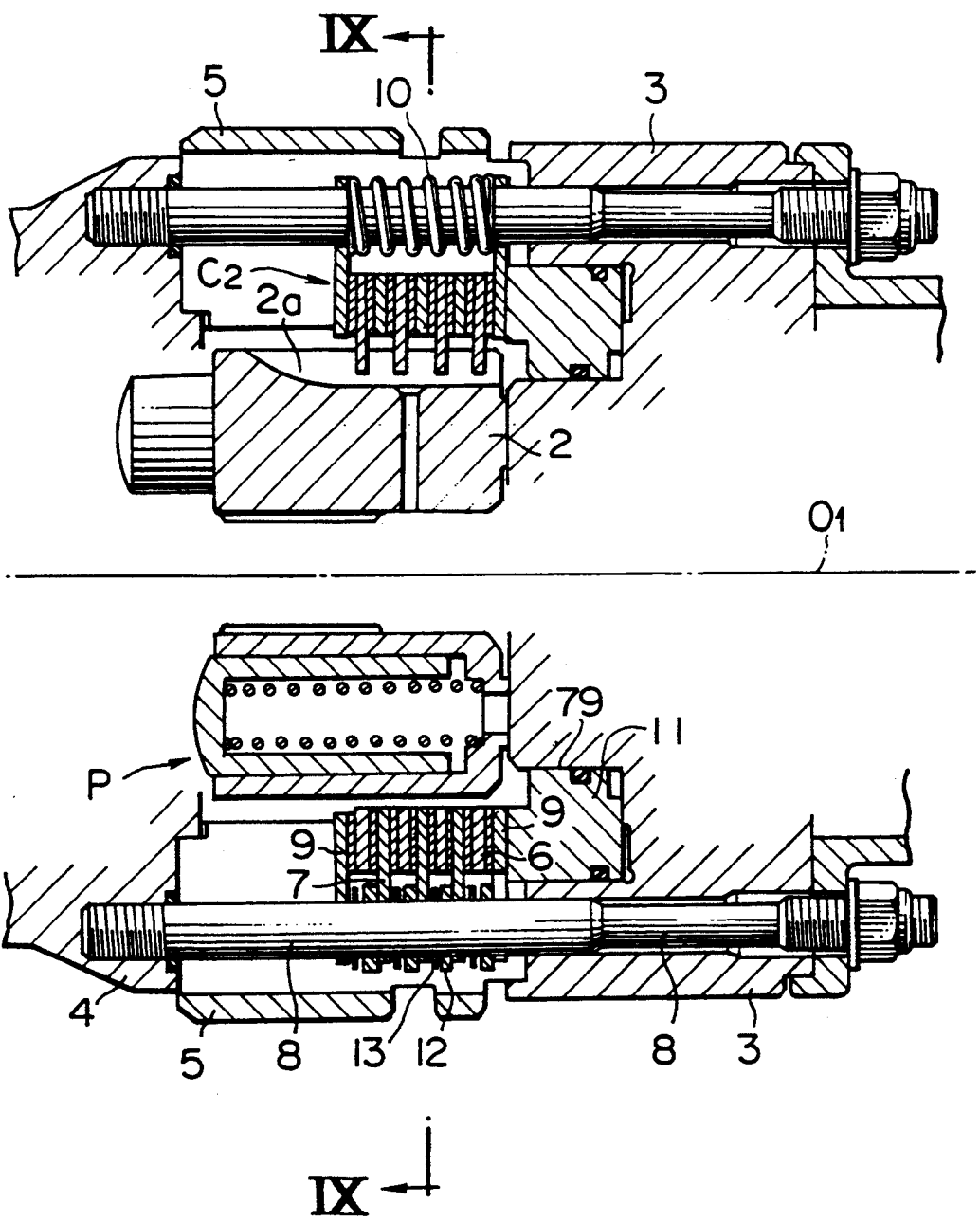
FIG. 8 shows longitudinal partial sectional views of a direct transmission clutch.

The construction of the direct transmission hydraulic clutch C2 will be described. Referring to FIG. 8, the intermediate drum 5 is rigidly connected to the motor cylinder block 4 and the valve body 3 by means of a number of studs 8, e.g., six, extending parallelly to the axis. The intermediate drum 5 is aligned with the hydraulic motor M, the hydraulic pump P and the valve body 3 so that their axes substantially coincide with the axis 01 of the input shaft 1.

Figure 9:
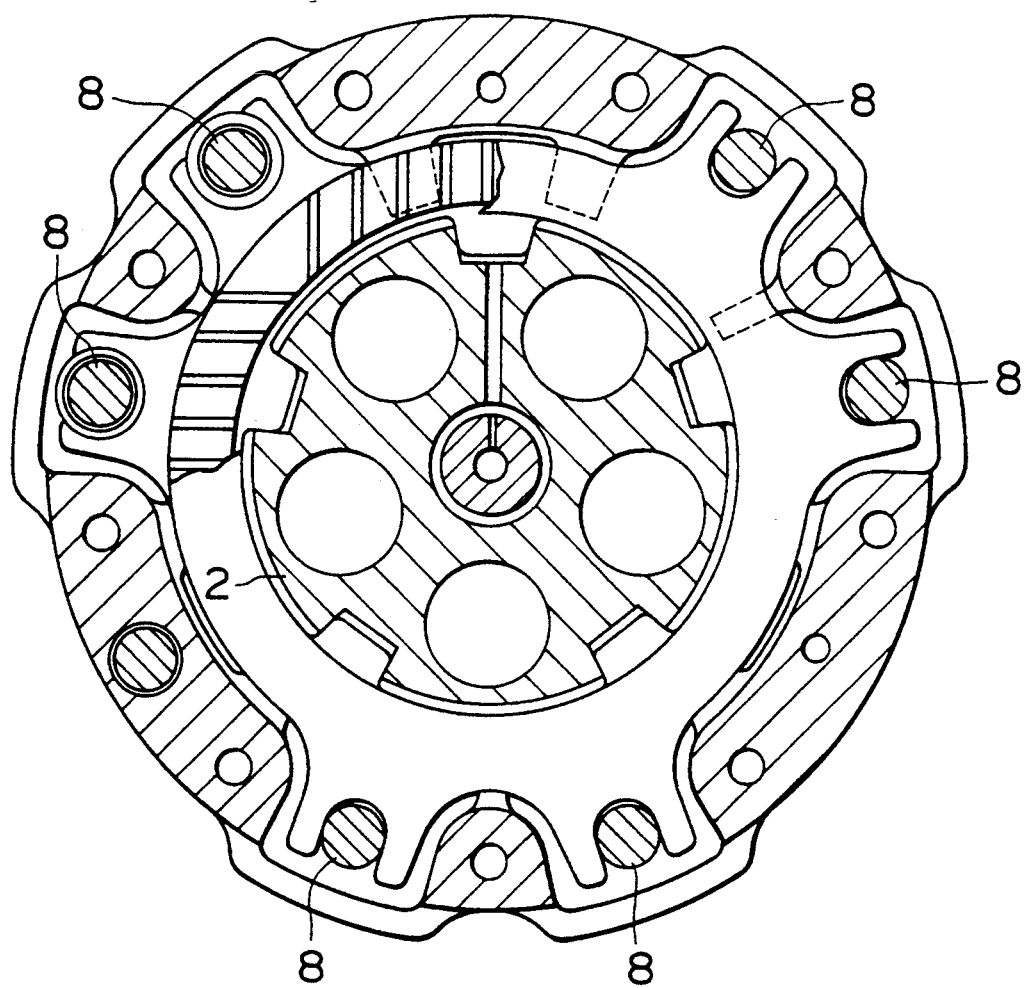
FIG. 9 is a sectional view taken on the line IX—IX of FIG. 8.

The direct transmission hydraulic clutch C2 is provided between the hydraulic pump P and the intermediate drum 5. The direct transmission hydraulic clutch C2 is a wet multiple disk clutch comprising many friction plates 6 and many separator plates 7 which are alternately juxtaposed. The friction plates 6 are engaged with splines 2a formed on the outer peripheral surface of the pump cylinder block 2 so as to be axially slidable and, further, rotatable together with the pump cylinder block 2. The separator plates 7 are engaged with three of the six studs. More specifically, they are engaged with one stud 8 of each pair of the three pairs of the studs 8 arranged in three separate portions, as shown in FIG. 9, so that the separator plates 7 are axially slidable and, further, rotatable together with the motor cylinder block 4, the intermediate drum 5 and the valve body 3.

The direct transmission hydraulic clutch C2 has a pair of pressure plates 9 which are provided at the front and rear end portions thereof and engaged with all the six studs 8 so as to be axially slidable. Thus, the pressure plates 9 are able to sandwich the friction and separator plates 6, 7. As shown in an upper part of FIG. 8, the studs 8 which are not engaged with the separator plates 7 are provided with coil springs 10 compressed between the pressure plates 9. The coil springs 10 provide forces which push the pressure plates 9 away from each other so as to disconnect the direct transmission hydraulic clutch C2.

A hydraulic piston 11 for operating the direct transmission hydraulic clutch C2 is fitted in an annular recess 79 formed in the valve body 3. The hydraulic piston 11 protrudes to push the adjacent pressure plate 9 forward so that the friction plates 6 and the separator plates 7 are clamped between the pressure plates 9, thus achieving direct transmission between the hydraulic motor M and the hydraulic pump P.

In order to substantially reduce drag rotation of the friction plates 6 and the separator plates 7 caused when the clutch C2 is disconnected, a spacer 12 and a web washer 13 are provided in each of the gaps between the separator plates 6 and each of the gaps between the pressure plates 9 and the adjacent separator plates 7. Thus, when the direct transmission hydraulic clutch C2 is disconnected, the spacers 12 and the web washers 13 forcibly provide gaps between the friction surfaces of these plates, thus substantially preventing the friction and separator plates 6, 7 from dragging one another to rotate.

The construction of the main clutch C1 for switching on and off the flow of the fluid between the hydraulic pump P and the hydraulic motor M will be described with reference to FIG. 3. The main clutch spool 30 is fitted in the inside cylindrical hole of the supporting shaft 25 so as to be rotatable with respect to the supporting shaft 25. The main clutch spool 30 is supported by thrust load balls 31 and 32 so as to smoothly rotate even when receiving a load acting in the axial directions. A front end portion of the main clutch spool 30 has: a longitudinal passage 115 which has an opening to the inner cavity 24b and extends therefrom backward along the spool's axis; and passages 116 radially extending from the rear end portion of the longitudinal passage 115 to the outside surface of the main clutch spool 30. On the other hand, the supporting shaft 25 has passages 117 which have axes present on the same plane as the axes of the passage 116 and which extend outward to the outer cavity 24a. Therefore, by rotation of the main clutch spool 30 relative to the supporting shaft 25, the passages 116 are connected to or disconnected from the passages 117, thus switching on and off the main clutch C1.

Figure 7A:
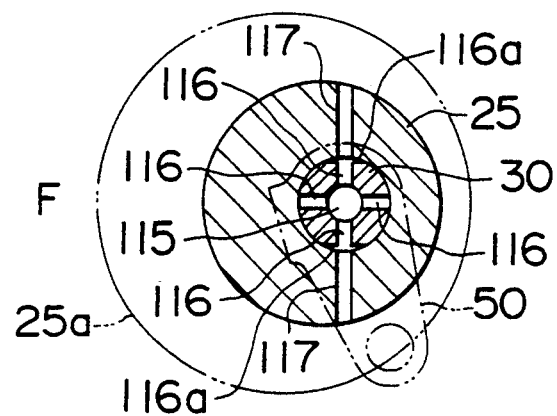
FIGS. 7A, 7B, 7C illustrate the operation of a main clutch.
Figure 7B:
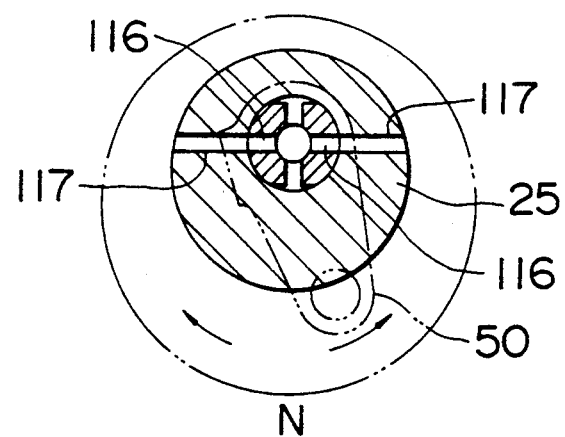
Figure 7C:
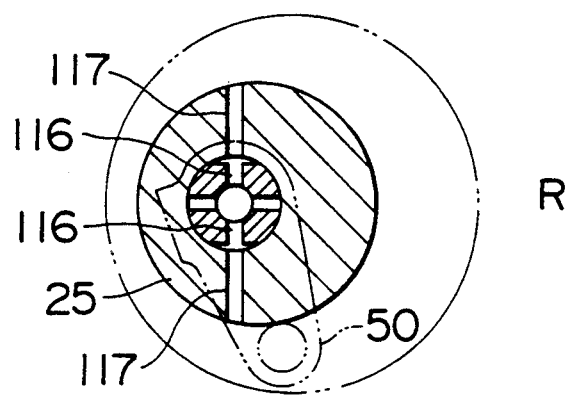

As shown in FIGS. 7A to 7C showing sectional views taken on the line VII—VII of FIG. 3, four passages 116 radially extending in the main clutch spool 30 are arranged in the shape of a cross, two of these passages extending vertically and the other two horizontally. Upper and lower end portions of the two vertically extending passages 116 are formed into grooves 116a extending in circumferential directions. The grooves 116a reduce the shocks caused by switching of the main clutch C1.

Two passages 117 are formed in the supporting shaft 25 so as to extend along a straight line which extends radially from the center axis of the main clutch spool 30 and perpendicularly to a straight line connecting the center of the main clutch spool 30 and the center of the eccentric cylindrical portion 25a of the supporting shaft 25 on the sectional plane employed in FIGS. 7A to 7C.

The openings of the two passages 117 on the inside peripheral surface of the supporting shaft 25 are arranged so as to provide a 180° phase difference in terms of the rotation relative to the outside peripheral surface of the main clutch spool 30.

FIGS. 7A, 7B and 7C show the states where the supporting shaft 25 rotated to the forward driving position F, the neutral position N and the rear driving position R, respectively. In all the states, the main clutch C1 is disconnected. While the main clutch C1 is disconnected, the passages 116 arranged like a cross are not inclined but positioned vertically or horizontally. As shown in FIG. 7A, when the supporting shaft 25 is at the forward driving position F, the two passages 117 of the supporting shaft 25 are connected to the two vertical passages of the four passages 116 of the main clutch spool 30. When the supporting shaft 25 is at the neutral position N, the two passages 117 of the supporting shaft 25 are connected to the two horizontal passages 116 of the main clutch spool shaft, as shown in FIG. 7B. When the supporting shaft 25 is at the rear driving position R, the passages 117 of the supporting shaft 25 are connected to the vertical passages 116 of the main clutch spool 30, as shown in FIG. 7C. Thus, the single mechanism comprising the passages 116 of the main clutch spool 30 and the two passages 117 of the supporting shaft 25 is able to disconnect the main clutch C1 by providing a short cut from the inner cavity 24b to the outer cavity 24a, whichever position the supporting shaft 25 assumes, the forward driving position F, the neutral position N or the rear driving position R.

As shown in FIG. 3, the inside cylindrical portion of the supporting shaft 25 is provided with a high-pressure relief valve 33. The high-pressure relief valve 33 releases fluid from the inner cavity 24b to the outer cavity 24a when the fluid pressure in the inner cavity 24b becomes greater than a preset level. Optionally, the relief valve 33 may be constructed so as to release fluid from the outer cavity 24a to the inner cavity 24b as well as from the inner cavity 24b to the outer cavity 24a.

Figure 14:
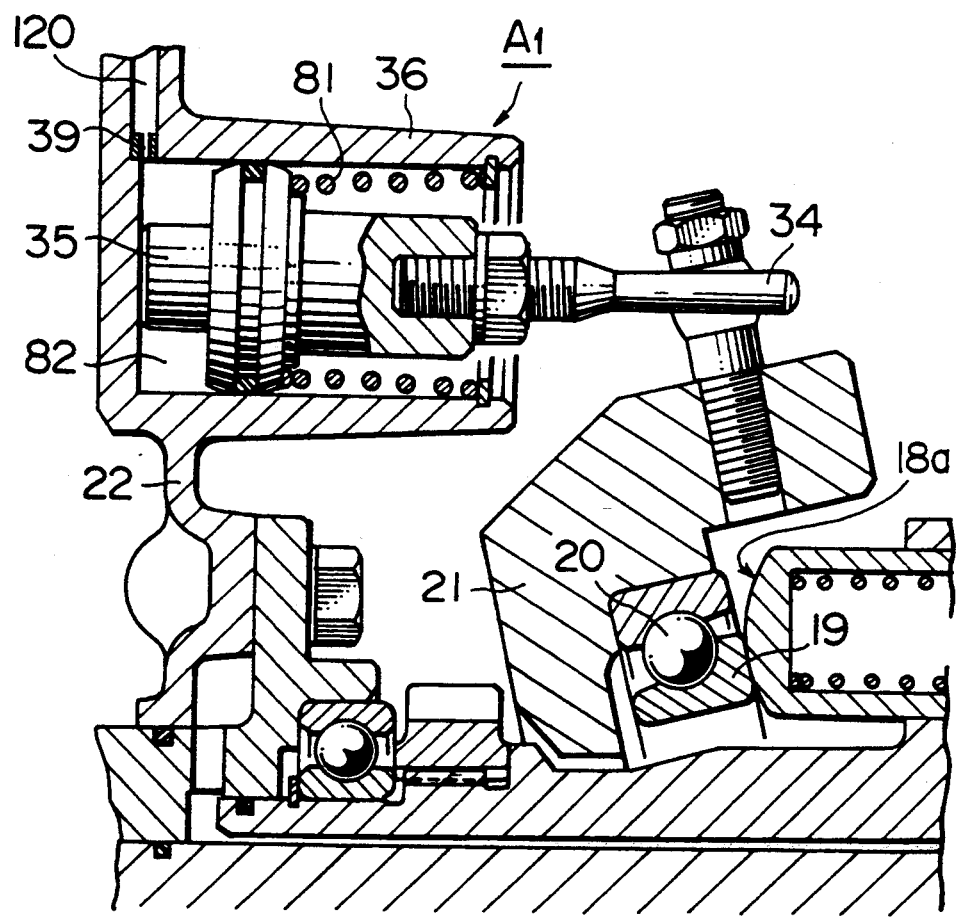
FIG. 14 is an enlarged sectional view of transmission control means.

The transmission control means for changing the tilt angle of the motor swash plate 19 will be described with reference to FIG. 14. The hydraulic actuator A1 for transmission control comprises: a cylinder 36 formed together with the transmission case 22; a piston 35 which has a spherical surface and is slidably fitted in the cylinder 36; and a compressed coil spring 81 provided between the piston 35 and a spring stopper ring provided at a rear end portion of the cylinder 36 so as to push the piston 35 forward. The piston 35 has a rod portion which is coupled to an end rod 34. The end rod 34 is connected to the motor swash plate holder 21 by ball-and-socket joint means. A fluid chamber 82 in the cylinder 36 is connected by way of a flow adjustment throttle 39 to a passage 120 formed in the wall of the transmission case 22. The passage 120 is connected to a so-called governor hydraulic source which varies the fluid pressure in proportion to the square of the rotational speed of the engine. The passage 120 is supplied with fluid whose pressure has been thus adjusted. Therefore, if the rotational speed of the engine increases, the fluid pressure in the fluid chamber 82 of the cylinder 36 is accordingly increased, thus pivoting the motor swash plate 19 so that the angle thereof with respect to the input shaft 1 becomes closer to 90°, despite the restoring force of the compressed coil spring 81.

The transmission ratio of the rotational speed of the hydraulic motor M to the rotational speed of the hydraulic pump P is obtained by the following expression:

---
Transmission Ratio
= Pump Rotational Speed/Motor Rotational Speed
= 1 + (Motor Capacity/Pump Capacity)
---

As understood from the above expression, the transmission ratio can be changed from one to a desired value by changing the capacity of the hydraulic motor M from zero to a corresponding value. The motor capacity is determined by the stroke length of the motor plungers 18, which length is determined by the angle of the motor swash plate 19. If the angle of the motor swash plate 19 is 90° with respect to the axis of the input shaft 1, the stroke length of the motor plungers 18 is zero, and the motor capacity is zero; therefore, the transmission ratio is one. As the angle of the motor swash plate 19 with respect to the axis of the input shaft 1 is reduced as shown in FIG. 1, the transmission ratio is increased.

The trunnion shaft 22a is positioned so that its axis is deviated from the rotational axis of the hydraulic motor M away from the hydraulic actuator A1 (downward in FIG. 1). Further, the trunnion shaft 22a is positioned to the rear of the motor swash plate 19. If the motor load is increased and, thus, the fluid pressure in the motor plungers 18 is increased, the motor plungers 18 are operated so as to incline the motor swash plate 19 about the trunnion shaft 22a, more specifically, so as to reduce the angle of the swash plate 19 with respect to the input shaft 1, thus increasing the transmission ratio (speed reduction ratio).

As described above, the transmission control means automatically achieves a transmission ratio corresponding to the engine speed and the hydraulic motor load, by using a combination of: the governor hydraulic source which increases the fluid pressure in the fluid chamber 82 of the cylinder 36, corresponding to an increase in the engine speed, so that the angle of the motor swash plate 19 with respect to the input shaft 1 is increased; the motor swash plate 19 arranged with the trunnion shaft 22a so as to be inclined by the reaction force of the motor plungers 18 when the motor load is increased; a coil spring 81 which presses the piston 35 in such a direction that the angle of the motor swash plate 19 with respect to the input shaft 1 decreases.

Figure 10:
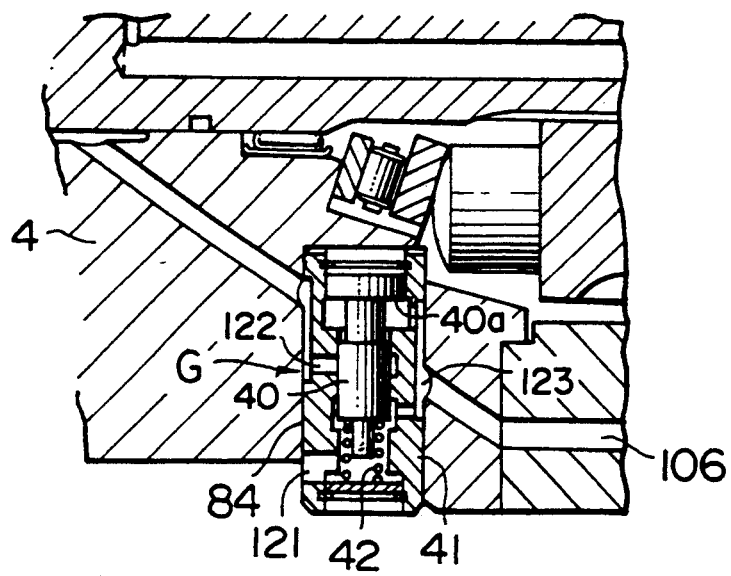
FIG. 10 is a portion including the governor valve shown in FIG. 1.

The construction of a centrifugal governor valve G of the direct transmission hydraulic clutch C2 will be described with reference to FIG. 10. The centrifugal governor valve G is provided in the motor cylinder block 4, at an intermediate portion of the direct transmission hydraulic clutch operating fluid passage 106. The centrifugal governor valve G comprises a movable stepped spool 40 and a stationary-sleeve 41. The stationary sleeve 41 is fixed into a hole 84 formed in the motor cylinder block 4. The movable stepped spool 40 is fitted in the stationary sleeve 41 so as to be movable along a radius of the motor cylinder block 4. The movable stepped spool 40 is pushed by a compressed coil spring 42 inward along a radius of the motor cylinder block 4 (to the closed position). A drain hole 121 is connected to the outside of the motor cylinder block 4 when the stepped movable spool 40 is at the closed position, so that the fluid leaked from the direct transmission hydraulic clutch C2 is returned to the inside of the transmission case 22.

When the motor cylinder block 4 is rotated, the movable stepped spool 40 is moved outward by the centrifugal force, despite the restoring force of the compressed spring 42. When the rotational speed of the motor cylinder block 4 reaches a predetermined value, the movable stepped spool 41 comes to such a position that an inlet passage 122 and an outlet passage 123 formed in the stationary sleeve 41 are connected, thus allowing the fluid to flow through a ring-like stepped portion 40a of the movable stepped spool 40. Because of the difference between the area of a small-diameter portion and the area of a large-diameter portion of the spool 40 (the sectional areas thereof), the fluid flowing through the sleeve 41 generates a force which pushes the spool 40 inward along a radius of the motor cylinder block 4. Because the movable stepped spool 40 stays in this position due to the balance between the inward-acting force caused by the area difference and the outward acting force, that is, the centrifugal force, fluid having a pressure substantially in proportion to the square of the rotational speed is constantly sent to the fluid chamber 105 of the direct transmission hydraulic clutch C2.

As the rotational speed increases, the fluid pressure in the direct transmission hydraulic clutch C2 increases. Thus, the direct transmission hydraulic clutch C2 enters the half clutch state in an intermediate speed range and the full clutch state in a high speed range.

Figure 4:
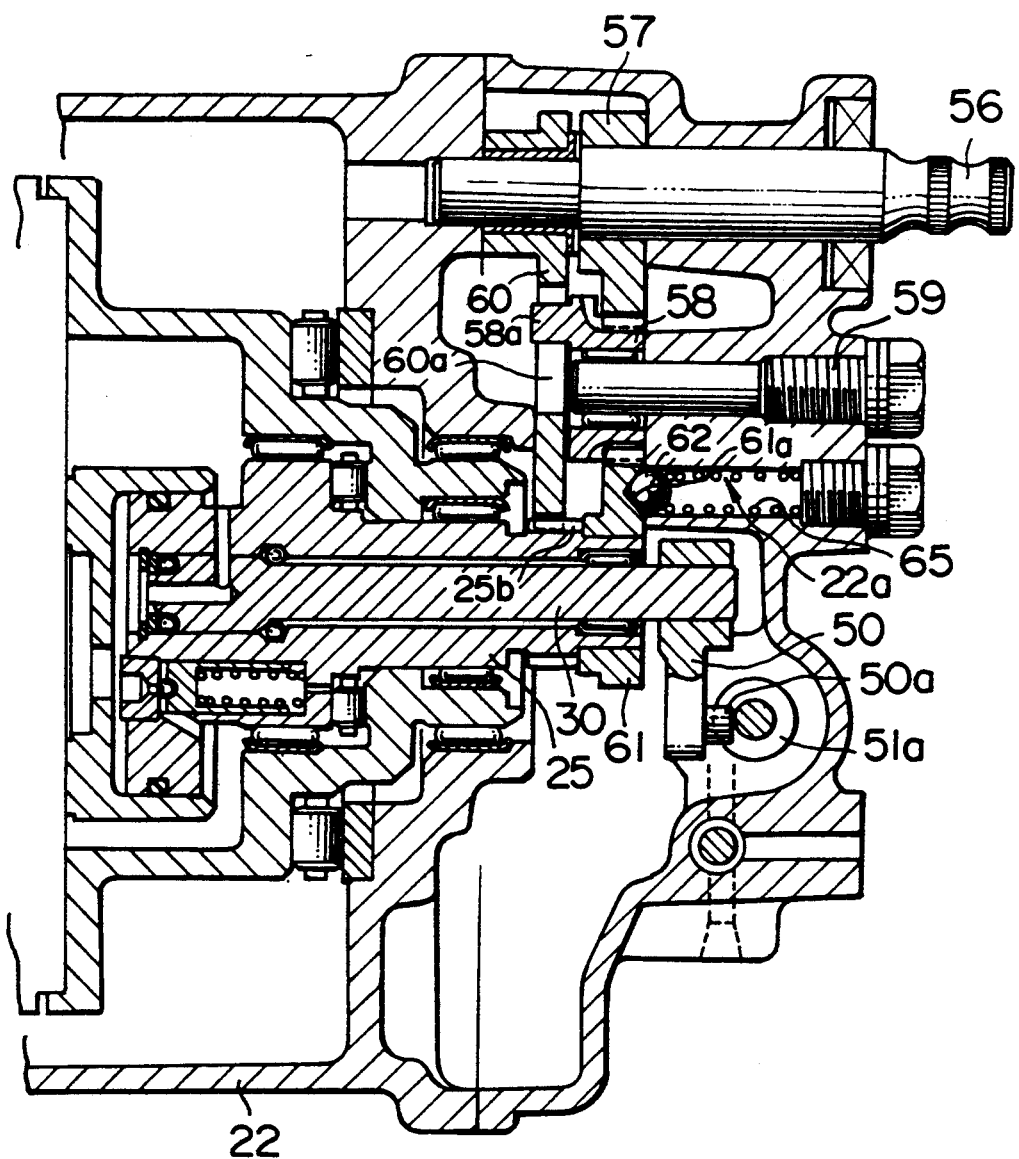
FIG. 4 is a longitudinal sectional view of the portion III including shift means.

Shift means for shifting the fluid distributor ring supporting shaft 25 to the forward driving position F, the neutral position N and the rear driving position R will be described. Referring to FIG. 4, the supporting shaft 25 has a gear portion 25b formed at a rear end portion thereof. The gear portion 25b is engaged with a sector-shape shift gear 60 which is rotatably supported at its upper portion by a shift shaft 56. The shift gear 60 has a long hole 60a extending vertically in a middle portion of the shift gear 60. The long hole 60a is engaged with an eccentric cylindrical projection 58a of an intermediate gear 58. The intermediate gear 58 is rotatably journaled to a supporting pin 59 fixed to the transmission case 22 and is engaged with a driving gear 57. The driving gear 57 is rigidly connected to the shift shaft 56 by means of a spring pin or the like. The shift shaft 56 is rotatably supported by a boss portion formed in the transmission case 22 and protrudes out from the transmission case 22. The protruding portion of the shift shaft 56 is drivingly connected to a suitable operating member such as an operating lever. Thus, by rotating the shift shaft using a suitable operating member, the intermediate gear 58 is rotated, the eccentric cylindrical projection 58a thus pivoting the shift gear 60 about the shift shaft 56, and then the shift gear 60 rotating the supporting shaft 25 by means of the gear 25b.

The intermediate gear 58 is engaged with a cam plate 61 which is rotatably journaled to a rear end portion of the supporting shaft 25. The cam plate 61 has detent grooves which define the forward and rear driving positions and the neutral position. A locking steel ball 62 is releasably engaged with a detent groove 61a. The locking steel ball 62 is fitted in a hole 22a formed in the transmission case 22 and pressed to the cam plate 61 by a compressed coil spring 65 provided in the hole 22a. Because of the restoring force of the compressed coil spring 65, the steel ball 62 is engaged with a detent groove 61a.

As shown in FIG. 6, the cam plate 61 has: a projected cam portion 61b for preventing an operation error and opening a clutch valve so as to disconnect power transmission between the hydraulic pump P and the hydraulic motor M; and a recess cam portion 61c for operating a neutral switch 86.

As shown in FIG. 12, stoppers 87c and 87d are provided at the right and left sides thereof (the right and left are indicated in the figure). The stoppers 87c and 87d are arranged so as to leave a predetermined distance therebetween. The stoppers 87c and 87b stop the shift gear 60 so that the supporting shaft 25 is unfailingly shifted to the forward driving position and the rear driving position, respectively. The stoppers 87c and 87d are attached to the transmission case 22 or the like in such a manner that the projection position of the stoppers can be adjusted by means not shown in the figures. The stopper 87c for defining the forward driving position is positioned in a rotational course H1 (to the right in the figure) which the shift gear 60 traces during the operation for shifting the supporting shaft 25 to the forward driving position, thus defining the maximum swing of the shift gear 60 during the forward driving operation. Since, as described above, the shift direction of the distributor ring 29 is the same as the rotational direction of the valve body 3, the distributor ring 29 can always be maintained at the forward or rear driving position despite dragging caused on the sliding surfaces of the distributor ring 29 and the valve body 3. During the forward driving operation, the dragging causes a force which acts on the shift gear 60 in the direction toward the stopper 87c defining the forward driving position. During the rear driving operation, the dragging causes a force which acts on the shift gear 60 in the direction toward the stopper 87d defining the rear driving position. Thus, the dragging does not shift the position of the distributor ring 29.

Further, an unintended shift of the shift gear 60 from either the forward or rear driving position to the neutral position is prevented as follows. As shown in FIG. 12, the angle a° between the center line S1 of the long hole 60a of the shift gear 60 and a line S2 passing through the centers of the intermediate gear 58 and the cylindrical projection 58a is set at substantially 90° or less. If the angle α° were set otherwise, the shift gear 60 would be unintendedly shifted to the neutral position when rotation of the hydraulic motor M is reversed by a load transmitted from the output shaft (which case may happen, for example, when the vehicle is on a slope) and, therefore, the dragging on the sliding surfaces of the valve body 3 and the distributor ring 29 is reversed in direction.

Control means of the main clutch C1 will be described with reference to FIG. 6. The spool 30 is rigidly connected at its rear end portion to a lever 50. The lever 50 has a cylindrical projection 50a formed on its end portion away from the spool 30. The projection 50a is engaged with a groove 51a which is formed on an end portion of a piston 51 of an actuator A2 for operating the clutch valve. A cylinder 52 is formed together with the transmission case 22. The piston 51 is fitted in the cylinder 52 so as to be movable perpendicularly to the axis of the spool 30 (to the right and left). The piston 51 divides the space inside the cylinder 52 into a left side chamber 125 and a right side chamber 126, and it is pushed by a compressed coil spring 53 to the right (to the clutch-off side). The cylinder 52 has in its lower portion: a left side hole 127 formed so as to be connected to the left side chamber 125; and a right side hole 128 formed so as to be connected to the right side chamber 126. These holes 127 and 128 are connected to a control spool hole 88 which extends parallel to the cylinder 52. A control spool 54 for selectively directing fluid into the cylinder 52 is fitted in the control spool hole 88. The control spool 54 has an annular passage 131 formed on its circumferential surface. A compressed coil spring 55 pushes the control spool 54 to the right. An inlet passage 132 is formed under a middle portion of the control spool hole 88 so as to be connected to the annular passage 131. As in the above-described transmission control means, the inlet passage 132 is connected at the other end thereof to a governor hydraulic source which varies the fluid pressure in proportion to the square of the engine speed. Thus, the cylinder 52 is supplied with fluid having a pressure thus determined. If the annular passage 131 formed on the control spool 54 is connected to the right side hole 128 as shown in FIG. 12, the fluid pressure in the right side chamber 126 of the cylinder 52 is increased in accordance with an increase of the engine speed, thus moving the piston 51 to the left despite the restoring force of the coil spring 53. As a result, the spool 30 is rotated by means of the lever 50 so as to shift the main clutch 1 from the half-clutch position to the clutch-on position.

Figure 13A:
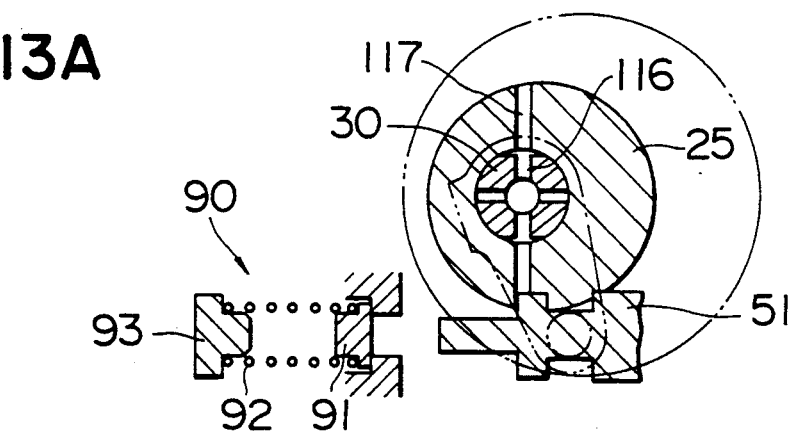
FIGS. 13A, 13B and 13C illustrate the operation of the main clutch.
Figure 13B:
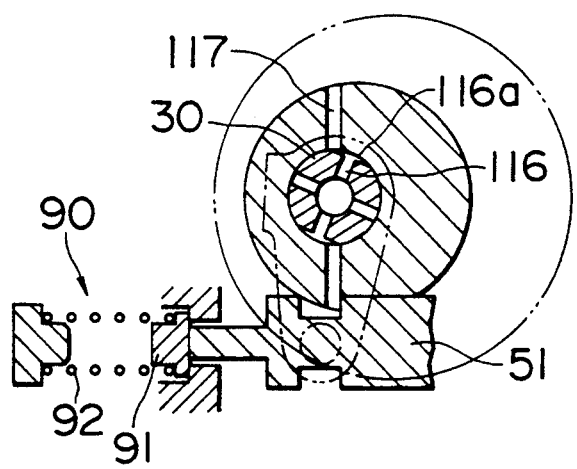
Figure 13C:
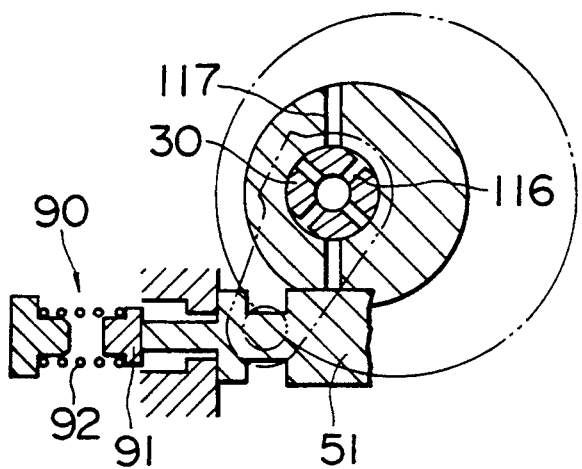

As shown in FIG. 6, damper means 90 for achieving two-phase action of the piston 51 is provided to the left of the piston 51. The damper means comprises: a movable member 91 facing the left end of the piston 51; a stationary spring stopper 93 which is provided to the left of the movable member 91 and fixed to the transmission case 22 or the like; a compressed coil spring 92 placed between the movable member 91 and the stationary spring stopper 93; a seat portion 94 which is provided to the right of the movable member 91 so as to stop the movable member 91 which is pushed by the coil spring 92. To connect the main clutch C1 which is in the clutch-off state (where the pressure is fully reduced) as shown in FIG. 13A, the actuator A2 rapidly operates until the piston 51 contacts the movable member 91 (the half-clutch state where the pressure is half reduced) as shown in FIG. 13B, and then the piston 51 is operated slowly due to the restoring force of the coil spring 92 until the passages 116 are completely disconnected from the passages 117 (the clutch-on state).

Figure 11:
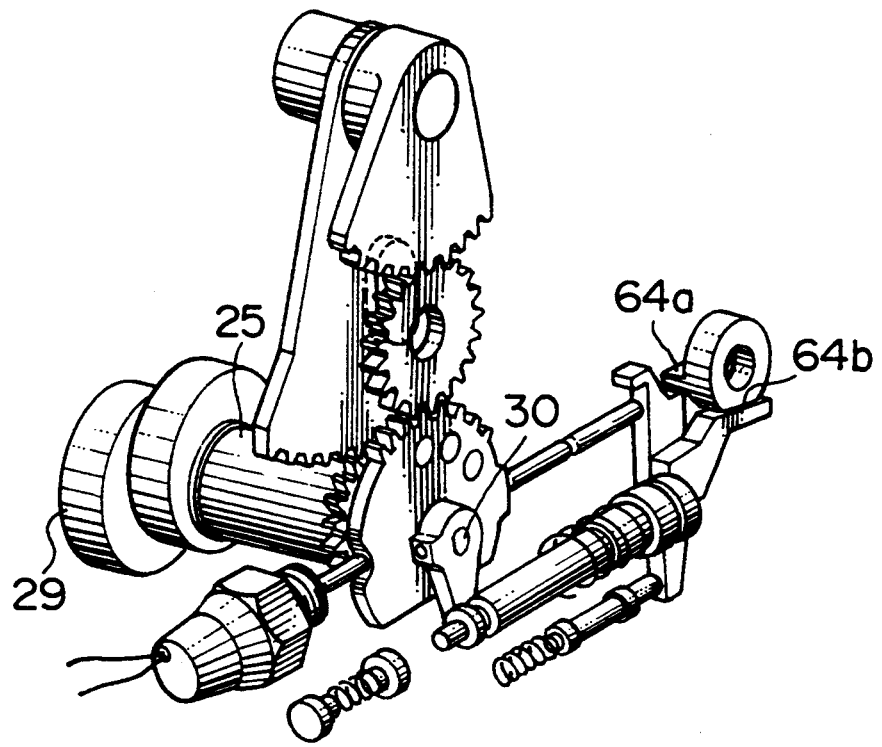
FIG. 11 is a perspective view of the shift means.

The operational relation between the clutch control means and the shift operation means will be described. As shown in FIG. 6, a pin hole 68 is formed above the cylinder 52 of the actuator A2 so as to extend to the right and left at substantially the same level as the spool 30. A pin 62 is fitted in the pin hole 68 so as to be slidable to the right and left. The pin 62 protrudes from the pin hole 60 to the right and left. The left end of the pin 62 is in contact with the above-mentioned cam plate 61. A cam shaft 64 is provided to the right of the right end of the pin 62 and drivingly connected to the main braking apparatus of the vehicle. As shown in FIG. 11, the cam shaft 64 has a projection 64a and a cut-away flat surface 64b which are formed in the front and lower portions, respectively, of the cam shaft 64. FIG. 12 shows the cam shaft 64 when the brake is not operated. If the brake is operated, the cam shaft 64 is rotated in the direction indicated by the arrow B.

To the right of the cylinder 52, an arm 63 is rotatably supported by a shaft 66. The arm 63 extends substantially vertically and has a sub-arm 67 formed together with or rigidly connected to the arm 63. An upper end portion of the arm 63 is positioned between the pin 62 and the cam shaft 64. The upper end portion thereof has: a stopper portion 63d formed substantially in the shape of a letter L, the end portion of the stopper portion 63d protruding to the left; a stepped portion 63c formed on the right side of the upper portion; and a right-side shoulder portion 63a extending from the stepped portion 63c so as to face the cam shaft 64. A lower end portion of the arm 63 is in contact with the right end of the control spool 54. The sub-arm 67 extends from the arm 64 in an upper right direction, and has a flat surface formed on its upper end portion so as to face the flat surface 64b of the cam shaft 64.

The arm 63 restricts the movements of the spool 54, the cam shaft 64 and the pin 62. During the brake-off state as shown in FIG. 12, the projection 64a of the cam shaft 64 is rotationally positioned at the left side of the cam shaft 64 so as to stop the arm 63 by the contact with the right shoulder portion 63a. Thus, the pin 62 is prevented from moving to the right by the arm 63. Therefore, the forward driving position (the position shown in FIG. 12) cannot be shifted to the neutral position, even if the shift shaft 56 is forced to rotate in the direction indicated by the arrow H. The shift shaft 56 cannot be rotated in that direction because the cam plate 61 is prevented from rotating in the direction indicated by the arrow F, by the pin 62 stopping the cam portion 61b of the cam plate 61.

In the neutral position as shown in FIG. 6, the cam portion 61b of the cam plate 61 abuts on the pin 62 so that the pin 62 is shifted to the right, thus tilting the upper portion of the arm 63 to the right. As a result, the control spool 54 is pushed to the left by the lower portion of the arm 63, so as to connect the inlet passage 132 to the left side chamber 125 of the actuator A2. The thus-increased fluid pressure in the left-side chamber 125, together with the compressed coil spring 53, pushes the piston 51 to the right end of the cylinder 52. Therefore, even if the engine speed is increased while the neutral position is assumed, the piston 51 does not move to the left but remains to the right, causing the lever 50 to remain in the position, thus maintaining the reduced-pressure state (the clutch-off state).

In the brake-off state as shown in FIG. 12, the projection 64a of the cam shaft 64 abuts on the right shoulder portion 63a of the arm 63, as described above. If the brake is operated, the cam shaft 64 is rotated in the direction indicated by the arrow B, thus disengaging the projection 64a from the right shoulder 63a of the arm 63. As a result, the pin 62 becomes free to move to the right. In short, the forward driving position can be shifted to the neutral position or the rear driving position when the brake is operated.

While the forward driving position is assumed, the lower flat surface 64b of the cam shaft 64 faces the upper flat surface of the sub-arm 67, as shown in FIG. 12. If the brake is operated, the cam shaft 64 is rotated, as described above, in the direction indicated by the arrow B, thus pushing down the sub-arm 67 so that the lower portion of the arm 63 swings to push the control spool 54 to the left. The inlet passage 132 is thus connected to the left side chamber 125 of the actuator A2. The resultant force created by the fluid pressure in the left side chamber 125 and the compressed coil spring 53 rapidly moves the piston to the right, thus rapidly disconnecting the main clutch C1.

The overall operation of the hydraulic transmission apparatus according to the present invention will be described.

When the pump cylinder block 2 is rotated by the rotation of the input shaft 1, the pump plungers 14 in the ejection process eject high-pressure fluid from the respective cylindrical holes 71 through the pump ejection passages 111 to the inner cavity 24b. The high-pressure fluid then flows into the cylindrical holes 73 which house the motor plungers 18 in the expansion process through the respective motor passages 113. On the other hand, the motor plungers 18 in the discharge process discharge the fluid from the respective cylindrical holes 73 through the respective motor passages 113 to the outer cavity 24a. The fluid discharged from the motor plungers 18 is drawn through the pump suction passages 110 to the pump cylindrical holes 71 whose pump plungers 14 are in the suction process. Thus, the motor cylinder block 4 is rotated by a combination of the reaction torque which the pump plungers 14 in the ejection process provide for the motor cylinder block 4 by means of the pump swash plate 15 and the reaction torque which the motor plungers 18 in the expansion process receive from the motor swash plate 19.

While the input shaft 1 is not rotated, the motor swash plate 19 is positioned at the maximum tilt angle (the tilt angle being measured between the swash plate 19 and a line perpendicular to the axis of the input line 1) as shown in FIG. 1. The maximum tilt angle of the motor swash plate 19 means the maximum transmission ratio. Because there is no centrifugal force, the spool 41 of the governor valve G is pushed all the way to the radially inner side by the restoring force of the compressed coil spring 42. The governor valve G is thus closed. In other words, fluid is not supplied to the chamber 105 of the direct transmission hydraulic clutch C2. The fluid leaked from the chamber 105 is drained through the drain hole 120 to the inside of the transmission case 22.

The fluid pressure in the chamber 82 of the transmission control actuator A1 is increased in proportion to the square of the rotational speed of the input shaft 1, as described above. Therefore, as the rotational speed of the input shaft 1 is increased, the piston 35 is accordingly moved backward pivoting the motor swash plate holder 21 toward the vertical position. Also, the spool 40 of the governor valve G is moved radially outward by centrifugal force. At a predetermined rotational speed of the input shaft 1, the spool 40 reaches such a position that the governor valve G is opened and the drain hole 121 is closed. Thus, fluid is supplied to the chamber 105 of the direct transmission hydraulic clutch C2, thus moving the hydraulic piston 11 forward so as to operate the direct transmission hydraulic clutch C2.

Because the pressure of the fluid supplied through the governor valve G is substantially in proportion to the square of the rotational speed of the hydraulic motor M, the direct transmission hydraulic clutch C2 becomes half connected (half-clutched) in an intermediate speed range, thus allowing for a kick-down operation, and it becomes completely connected (the direct transmission) in a high speed range.

A portion of the fluid supplied into the ring-like passage 101 provided around the input shaft 1 flows through the cooling fluid passage 103 to the direct transmission hydraulic clutch C2, thus cooling the friction and separator plates 6 and 7.

As described above, a hydraulic transmission apparatus according to the present invention comprises: a hydraulic pump having a pump cylinder block; a hydraulic motor which has a motor cylinder block and is arranged coaxially in a line with the swash plate pump so as to face in the same direction as the hydraulic pump; a hydraulic passage system connecting the hydraulic pump and the hydraulic motor; a pump swash plate provided at a side of the motor cylinder block, the side being close to the hydraulic pump; a motor swash plate which is provided at a side of the motor cylinder block, the side being away from the hydraulic pump, and whose tilt angle is varied so as to vary the capacity of said hydraulic motor; an intermediate drum surrounding the pump cylinder block; a valve body provided at a side of the hydraulic pump so as to be substantially coaxial with the hydraulic pump, the valve body being a component part of the hydraulic passage system; and a hydraulic distributor ring provided so as to be in slidable contact with the valve body by means of the pressure of the fluid ejected by the hydraulic motor. Therefore, the following advantages can be achieved.

According to the present invention, because the supporting shaft of the hydraulic distributor ring (the hydraulic distributor valve) which is in slidable contact with the valve body is provided at a side portion of the transmission apparatus, this supporting shaft achieves substantially as high a torsional rigidity as the hydraulic distributor valve (ring) supporting shaft disclosed in Japanese Utility Model Publication No. 42-19728 or Japanese Patent Publication No. 61-23412, thus achieving consistent timing of the distributor ring (valve).

Further, because the hydraulic distributor ring distributes the fluid coming from the hydraulic pump to the hydraulic motor at a side of the valve body, the hydraulic distributor ring according to the present invention easily achieves substantially the same capability of automatically reducing the gap between the sliding surfaces of the distributor ring and the valve body as the distributor valve disclosed in Japanese Patent Publication No. 61-23412. Thus, a significant reduction of the fluid leakage can be easily achieved without requiring a high-precision working process to reduce the gap therebetween.

Still further, because the hydraulic motor and the hydraulic pump are coaxially arranged in a line so as to face the same direction and the valve body is coaxially provided next to the hydraulic pump, the diameter of the hydraulic transmission apparatus can be reduced, thus reducing the inertia moment of the apparatus. Therefore, the performance of the hydraulic transmission apparatus in a high rotaional speed range and the vehicle mountability are enhanced. The diameter of the hydraulic pump can be significantly reduced if the transmission apparatus does not need to have a wide range of transmission ratios.

A hydraulic transmission apparatus according to the present invention further comprises a direct transmission hydraulic clutch provided between the pump cylinder block and the intermediate drum surrounding the pump cylinder block. Therefore, direct transmission in a high speed range can be achieved without increasing the diameter of the apparatus, thus enhancing the transmission efficiency of the apparatus and the durability of the hydraulic pump and the hydraulic motor. Further, because the direct transmission hydraulic clutch is automatically supplied with fluid which is leaked from the hydraulic pump, the means for cooling the direct transmission hydraulic clutch is simplified.

A hydraulic transmission apparatus according to the present invention further comprises a governor valve provided in an intermediate portion of the passage 106 for carrying fluid to the direct transmission hydraulic clutch, which governor valve increases the fluid pressure in accordance with an increase of the rotational speed. Therefore, the clutch timing can be determined in accordance with the vehicle speed, thus further enhancing transmission efficiency.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A hydraulic transmission apparatus comprising:
a hydraulic pump having a pump cylinder block;
a hydraulic motor which has a motor cylinder block and is arranged coaxially with the hydraulic pump so as to face in the same direction as the hydraulic pump and is in fluid communication with the hydraulic pump;
a pump swash plate provided at a side of the motor cylinder block close to the hydraulic pump;
a motor swash plate provided at a side of the motor cylinder block remote from the hydraulic pump and having a tilt angle which can be varied so as to vary the capacity of the hydraulic motor;
an intermediate drum surrounding the pump cylinder block;
a valve body provided at a side of the hydraulic pump so as to be substantially coaxial with the hydraulic pump;
a hydraulic distributor ring in slidable contact with the valve body; and
a direct transmission hydraulic clutch provided between the pump cylinder block and the intermediate drum.

2. A hydraulic transmission apparatus according to claim 1, further comprising a governor valve in fluid communication with the direct transmission hydraulic clutch for increasing fluid pressure in accordance with an increase in rotational speed.

3. A hydraulic apparatus according to claim 1 wherein the pump cylinder block is disposed between the valve body and the motor cylinder block.

4. A hydraulic apparatus comprising:
a hydraulic pump having a pump cylinder block;
a hydraulic motor which has a motor cylinder block and is arranged coaxially with the hydraulic pump so as to face in the same direction as the hydraulic pump and is in fluid communication with the hydraulic pump;
a pump swash plate provided at a side of the motor cylinder block close to the hydraulic pump;
a motor swash plate provided at a side of the motor cylinder block remote from the hydraulic pump and having a tilt angle which can be varied so as to vary the capacity of the hydraulic motor;

a valve body provided at a side of the hydraulic pump so as to be substantially coaxial with the hydraulic pump;

an intermediate drum surrounding the pump cylinder block and disposed between the valve body and the motor cylinder block; and a hydraulic distributor ring in slidable contact with the valve body.

5. A hydraulic apparatus according to claim 4 wherein the pump swash plate is supported by the motor cylinder block.

6. A hydraulic apparatus according to claim 5 wherein the pump swash plate is received within a recess of the motor cylinder block.

7. A hydraulic apparatus comprising:

a hydraulic pump having a pump cylinder block;

a hydraulic motor which has a motor cylinder block and is arranged coaxially with the hydraulic pump so as to face in the same direction as the hydraulic pump and is in fluid communication with the hydraulic pump;

a pump swash plate provided at a side of the motor cylinder block close to the hydraulic pump;

a motor swash plate provided at a side of the motor cylinder block remote from the hydraulic pump and having a tilt angle which can be varied so as to vary the capacity of the hydraulic motor;

an intermediate drum surrounding the pump cylinder block;

a valve body provided at a side of the hydraulic pump so as to be substantially coaxial with the hydraulic pump and in fluid communication with the motor cylinder block through the intermediate drum; and a hydraulic distributor ring in slidable contact with the valve body.

8. A hydraulic transmission apparatus comprising:

a hydraulic pump having a pump cylinder block with a plurality of pump plunger holes formed therein and a plurality of pump plungers slidably disposed in the pump plunger holes;

a hydraulic motor having a motor cylinder block coaxially arranged with the pump cylinder block and in fluid communication therewith, the motor cylinder block having a plurality of motor plunger holes formed therein in nonoverlapping relationship with the pump plunger holes and a plurality of motor plungers slidably disposed in the motor plunger holes;

a pump swash plate adjoining the motor cylinder block and opposing the pump cylinder block;

a motor swash plate adjoining the motor cylinder block and having a tilt angle which can be varied to vary the capacity of the hydraulic motor;

a valve body adjoining and substantially coaxial with the hydraulic pump and in fluid communication with the pump cylinder block and the motor cylinder block;

an intermediate drum adjoining the motor cylinder block and surrounding the pump cylinder block and disposed between the motor cylinder block and the valve body; and a hydraulic distributor ring in slidable contact with the valve body.

9. A hydraulic transmission apparatus according to claim 8 wherein the pump swash plate is received within a recess of the motor cylinder block.

10. A hydraulic transmission apparatus according to claim 8 wherein the pump plungers and the motor plungers extend in the same direction from the pump plunger holes and the motor plunger holes, respectively.

11. A hydraulic transmission apparatus according to claim 8 wherein the valve body fluidly communicates with the motor cylinder block through the intermediate drum.

12. A hydraulic transmission apparatus comprising:

a hydraulic pump having a pump cylinder block with a plurality of pump plunger holes formed therein and a plurality of pump plungers slidably disposed in the pump plunger holes;

a hydraulic motor having a motor cylinder block coaxially arranged with the pump cylinder block and in fluid communication therewith, the motor cylinder block having a plurality of motor plunger holes formed therein in nonoverlapping relationship with the pump plunger holes and a plurality of motor plungers slidably disposed in the motor plunger holes;

a pump swash plate adjoining the motor cylinder block and opposing the pump cylinder block;

a motor swash plate adjoining the motor cylinder block and having a tilt angle which can be varied to vary the capacity of the hydraulic motor;

an intermediate drum adjoining the motor cylinder block and surrounding the pump cylinder block;

a valve body adjoining and substantially coaxial with the hydraulic pump and in fluid communication with the pump cylinder block and the motor cylinder block;

a hydraulic distributor ring in slidable contact with the valve body; and a hydraulic clutch disposed between an inner peripheral surface of the intermediate drum and an outer peripheral surface of the pump cylinder block.

13. A hydraulic transmission apparatus according to claim 12 including a governor valve mounted on the hydraulic motor and in fluid communication with the clutch for adjusting fluid pressure applied to the clutch in accordance with rotational speed.

14. A hydraulic transmission apparatus comprising:

a hydraulic pump having a pump cylinder block with a plurality of pump plunger holes formed therein and a plurality of pump plungers slidably disposed in the pump plunger holes;

a hydraulic motor having a motor cylinder block coaxially arranged with the pump cylinder block and in fluid communication therewith, the motor cylinder block having a plurality of motor plunger holes formed therein in nonoverlapping relationship with the pump plunger holes and a plurality of motor plungers slidably disposed in the motor plunger holes;

a pump swash plate adjoining the motor cylinder block and opposing the pump cylinder block;

a motor swash plate adjoining the motor cylinder block and having a tilt angle which can be varied to vary the capacity of the hydraulic motor;

an intermediate drum adjoining the motor cylinder block and surrounding the pump cylinder block and having an end surface abutting an end surface of the motor cylinder block;

a valve body adjoining and substantially coaxial with the hydraulic pump and in fluid communication with the pump cylinder block and the motor cylinder block; and a hydraulic distributor ring in slidable contact with the valve body.

15. A hydraulic transmission apparatus comprising:

a hydraulic pump having a pump cylinder block with a plurality of pump plunger holes formed therein and a plurality of pump plungers slidably disposed in the pump plunger holes and extending from the pump plunger holes in a first direction;

a hydraulic motor having a motor cylinder block coaxially arranged with the pump cylinder block and in fluid communication therewith, the motor cylinder block having a plurality of motor plunger holes formed therein and a plurality of motor plungers slidably disposed in the motor plunger holes and extending from the motor plunger holes in the first direction;

a pump swash plate adjoining the motor cylinder block and opposing the pump cylinder block;

a motor swash plate adjoining the motor cylinder block and having a tilt angle which can be varied to vary the capacity of the hydraulic motor;

a valve body adjoining and substantially coaxial with the hydraulic pump and in fluid communication with the pump cylinder block;

an intermediate drum disposed between the valve body and the motor cylinder block and surrounding the pump cylinder block and fluidly connecting the valve body with the motor cylinder block; and a hydraulic distributor ring in slidable contact with the valve body.

* * * * *

UNITED STATES PATENT AND TRADEMARK OFFICE
CERTIFICATE OF CORRECTION

PATENT NO. : 5,394,698
DATED : March 7, 1995
INVENTOR(S) : Takagi et al.

It is certified that error appears in the above-indentified patent and that said Letters Patent is hereby corrected as shown below:

On the title page,

Item [57], In the Abstract, line 1, after "has" delete --:--;

Line 2, after "block" delete --;--.

Signed and Sealed this

Fourteenth Day of November, 1995

Attest:

BRUCE LEHMAN

Attesting Officer

Commissioner of Patents and Trademarks